United States Patent
Klose et al.

(10) Patent No.: US 12,105,021 B2
(45) Date of Patent: Oct. 1, 2024

(54) THz MEASURING DEVICE AND METHOD FOR MEASURING A MEASURING OBJECT

(71) Applicant: CiTEX Holding GmbH, Melle (DE)

(72) Inventors: Ralph Klose, Melle (DE); Arno Neumeister, Porta Westfalica (DE)

(73) Assignee: CiTEX Holding GmbH, Melle (DE)

( * ) Notice: Subject to any disclaimer, the term of this patent is extended or adjusted under 35 U.S.C. 154(b) by 65 days.

(21) Appl. No.: 17/953,577

(22) Filed: Sep. 27, 2022

(65) Prior Publication Data
US 2023/0093966 A1 Mar. 30, 2023

(51) Int. Cl.
*G01N 21/35* (2014.01)
*G01B 11/06* (2006.01)
*G01N 21/3563* (2014.01)
*G01N 21/3581* (2014.01)

(52) U.S. Cl.
CPC ......... *G01N 21/3581* (2013.01); *G01B 11/06* (2013.01); *G01N 21/3563* (2013.01)

(58) Field of Classification Search
CPC . G01N 21/3581; G01N 21/3563; G01B 11/06
See application file for complete search history.

(56) References Cited

U.S. PATENT DOCUMENTS

| | | | | |
|---|---|---|---|---|
| 2007/0235658 A1* | 10/2007 | Zimdars | ............. | G01N 21/3586 |
| | | | | 250/390.07 |
| 2011/0298652 A1* | 12/2011 | Yanagihara | ........... | G01S 13/874 |
| | | | | 342/146 |
| 2019/0331594 A1* | 10/2019 | Klose | .................... | G01N 21/952 |
| 2021/0156683 A1 | 5/2021 | Littau | | |
| 2021/0370574 A1 | 12/2021 | Sikora | | |
| 2022/0178677 A1* | 6/2022 | Böhm | ................ | G01N 21/3581 |

FOREIGN PATENT DOCUMENTS

| | | |
|---|---|---|
| DE | 202016008526 U1 | 5/2018 |
| DE | 102017207648 A1 | 11/2018 |
| DE | 102017125740 A1 | 5/2019 |
| DE | 102018124175 A1 | 4/2020 |
| WO | 2016139155 A1 | 9/2016 |

* cited by examiner

*Primary Examiner* — Hugh Maupin
(74) *Attorney, Agent, or Firm* — Barnes & Thornburg LLP (57) ABSTRACT

The present disclosure relates to a THz measuring device for measuring a measuring object and a THz measuring method for measuring a measuring object.

24 Claims, 4 Drawing Sheets

THz MEASURING DEVICE AND METHOD FOR MEASURING A MEASURING OBJECT

PRIORITY CLAIM

This application claims priority to German Patent Application No. DE 10 2021 125 196.6, filed Sep. 29, 2021, which is expressly incorporated by reference herein.

BACKGROUND

The present disclosure relates to a THz measuring device as well as a THz measuring method for measuring a measuring object. The measuring object may, in particular, be guided continuously through a measurement space of the THz measuring device. What is measured can be, in particular, a layer thickness and/or a material property of the measuring object.

SUMMARY

According to the present disclosure, a THz measuring device may be used, in particular, using a THz measuring method according to the present disclosure. The THz measuring method according to the present disclosure can be carried out, in particular, using a THz measuring device according to the present disclosure.

The measuring arrangement according to the present disclosure comprises the THz measuring device with a measuring object, and optionally a conveyor means and/or production means for producing the measuring object, the production means can for example be an extruder.

In the content of the present disclosure, THz means Terahertz, and interface means boundary surface.

As measuring object, in particular, a strand may be measured which, in particular, may be of circular or rectangular cross-section. As strand may be measured, in particular: a pipe, profile, cable, hose, foil, also e.g. a semi-open profile such as a trough. The material may be plastics, rubber, cellulose, ceramics or another material permeable for THz radiation. According to the present disclosure, in particular, geometric properties like wall thicknesses, exterior diameters, interior diameters may be determined, and also material properties like a refraction index and/or a speed of light. Further, faults of the measuring object like inclusions, air bubbles and/or deformation of the interfaces can be detected.

The measuring object may, in particular, be transported continuously through the measurement space and be continuously measured, in particular, after being produced, e.g., subsequent to extrusion of the strand. In particular, changes, deviations and potentially faults can be detected continuously and, in particular, by comparison of the measuring signals.

In the method according to the present disclosure, successive steps of carrying out an empty measurement or, respectively, calibration measurement with an empty measurement space, i.e., without an included measuring object, and carrying out at least one subsequent object measurement.

Thus, the device according to the present disclosure comprises at least one pair of THz transceivers, i.e., a first and second THz transceiver, arranged with a measurement space between them and lying opposite with a common optical measuring axis. Hereby, at least the second transceiver is able to detect the radiation emitted by the first transceiver. The two THz transceivers are synchronised by a synchronising means so as to determine times of flight and/or changes in the times of flight in the various steps. The synchronising means preferably effects a temporal alignment of the points in time determined and/or fixed by the first and second THz transceivers. To that end the synchronising means sends synchronising signals to the first transceiver and the second transceiver so that equal or comparable points in time can be fixes. To that end, according to the present disclosure, in particular, it is also recognised that the comparability of a measurement is more relevant that the fixing of a precise point in time, because systematic deviations can be eliminated when determining the differences.

During the empty measurement THz radiation is put out by the first THz transceiver along the optical measuring axis through the empty measuring space to the second THz transceiver and an empty time of flight through the measuring space is determined. Thus, there will be no reflection of the emitted THz radiation to return it to the transmitting transceiver.

The step of measuring the total time of flight is carried out in a measuring device unchanged in relation to the empty measurement, whereby the measuring object is guided though the measuring space. Thus, the first THz transceiver emits the THz radiation along the optical measuring axis through the measuring space and through the measuring object towards the second THz transceiver, which in turn determines a time of flight of the THz radiation. Thus, with the measuring device unchanged, it is possible to carry out a precise comparison of the empty measurement and the measurement with a measuring object.

Further, measurements of two wall times of flight of the measuring object are carried out, in which, in particular, each respective wall area lying opposite the THz transceiver is measured in reflection. Thus, the first and second THz transceiver will each emit THz radiation which will be reflected at the interfaces of the wall area back to the THz transceiver.

Thus, according to the present disclosure, initially a more costly realisation of the synchronisation in terms of measuring technology is provided, whereby, however, the present disclosure also brings about a few advantages. In particular, compared to document WO 2016/139155 A1 measurements are carried out in which the THz radiation does not traverses the wall areas multiple times.

Thus, when measuring the total time of flight, the two wall areas are each passed once by the THz radiation. Because in the measurements of the wall times of flight each wall area is measured by the THz transceiver which lies opposite or, respectively, closer to the wall area, it is not necessary for the THz radiation to first run through a first wall area to carry out an individual measurement of the rear wall area. Thus, it is possible, in particular, to securely measure even pipes with higher carbon black content and/or in case of moisture despite the absorption by the material.

The measuring of the total time of flight can be combined with one of the two measurements of the wall time of flight so that, here, for one thing, the first THz transceiver sends the radiation in transmission to the second THz transceiver, and, for another, determines the wall time of flight of the wall region facing it.

Thus, each of the two THz transceivers is able to respectively measure the wall area facing it, i.e. the one in front and/or lying before it, i.e., in particular, a layer thickness of the wall area lying before it. This also allows for a more exact measurement, in contrast to a measurement of the rear wall area, because in measuring the rear wall area the radiation must first pass through the wall area lying in front of the transceiver, and also the beam reflected in the rear wall area must pass again through the front wall area. Thus, with such measurements of a layer thickness of the rear wall area there will always be high absorption in the measuring object which will attenuate the relatively weak reflection radiation from interfaces even more. According to the present disclosure, however, a strong signal can be obtained even when measuring the wall areas.

Thus, this way of conducing measurements of the front wall area always by each transceiver co-operates with, in particular, the principle of direct measuring of the transmission in the empty measurement and measuring with a measuring object, because in each of the, e.g., four measurements strong measuring signals can be determined which can be evaluated together. Thus, the measuring device and evaluation can be adapted to such strong signals.

Hereby, it is possible to carry out the measurements of the total time of flight of the first or the second wall time of flight by the transceivers together, i.e., in particular, in a single measuring step.

A further advantage lies in the symmetry of the design so that the empty measurement can be carried out alternatingly by both THz transceivers which allows for a comparison for correcting inequalities or for compensation respectively, whereby, e.g., an averaged value can be utilised. Thus, it is possible to carry out both the empty measurement and the measurement of the total time of flight from both sides so as to, e.g., validate the plausibility of measurements and/or to average them. An alternating transmission measuring of the total time of flight can be combined with the two single measurements of the wall times of flight.

Moreover, compared to e.g. mirror designs using mirrors, a more exact alignment of the THz transceivers is possible.

Also, according to the present disclosure, it is possible to securely detect faults in the measuring object, such faults becoming apparent, in particular, in the signal strength and/or signal shape. Upon detection of a fault, subsequently, e.g., the THz transceivers may be guided towards the determined location of the fault to conduct further or more precise measurements.

The steps of the method according to the present disclosure may also be carried out in a changed sequence and repeated as desired.

According to advantageous embodiments, a fully circumferential measuring of the measuring object is carried out using a static design including a plurality or pairs of transceivers, and/or using a non-static measurement, in which one or more transceiver pairs rotate around the measuring space or reverse, i.e., moving forwards and backwards.

A further advantage of the present disclosure lies in the design of various beam shapes. In principle, the THz beam can be focussed, e.g., to an axis of symmetry of the strand. According to an advantageous alternative embodiment, a parallel THz beam is emitted, leading to certain advantages. Thus, in the case of a THz beam focussed to the axis of symmetry there will be time of flight differences present already based upon different wavelengths which can be largely avoided when emitting parallel THz radiation. Further, according to the present disclosure, the measurement of the wall times of flight is improved by parallel radiation because focussing on the axis of symmetry leads to an imprecise measurement of the wall area lying in front of the axis of symmetry. Further, the parallel THz radiation also improves the detection in the event of a not precisely positioned pipe. Also, the influence of multiple reflections is reduced compared to an embodiment with a mirror.

In particular, the THz beam can be emitted in a two-dimensional parallel manner, i.e., not only parallel in one direction and linear focused in the other, but, preferably, parallel in a two-dimensional cross-section. This allows for a broad detection of the area of the measuring object, with an advantageous evaluation.

Hereby, the first and/or second THz transceiver may comprise, in particular, a radiation optics including, in particular, a converging lens, for parallel alignment of the emitted THz radiation and/or for receiving parallel THz radiation.

The measuring according to the present disclosure may be utilised in a manufacturing process, e.g. extrusion process, directly to regulate manufacturing parameters.

The THz radiation may have, in particular, a frequency within a range of between 10 GHz and 50 THz, e.g. 20 GHz and 4 THz, e.g. 50 GHz and 1 THz, and used by way of direct time of flight measurement, frequency modulation or pulsed radiation. Thus, the THz radiation may also lie, in total or in part, within the range of microwave radiation or radar radiation.

According to an embodiment, the radiation emitted by the two THz transceivers may have equal frequencies. Hereby, equal THz transceivers and/or equal chips may be utilised, adding a cost benefit. Thus, it is also possible, e.g., to average the measured values.

As an alternative to the embodiment of the THz transceivers or the measurements with equal frequencies, however, differing and/or overlapping frequency ranges may be selected so as to achieve other advantages, e.g., as a multiple frequency measuring process to attain a higher resolution of distances along the beam axis, e.g., a higher resolution of layer thicknesses. Thus, for the measurements differing and/or overlapping frequencies or frequency ranges may be selected or representing different partial areas of a band width so that the measuring signals can subsequently be combined to an evaluation signal. From this, preferably, it is then possible to determine a fundamental frequency of the evaluation signal so as to subsequently carry out a computation of one of more layer thicknesses. Such a method has been described, e.g., in the document WO2018202696A1; it allows for a very high resolution of layer thicknesses. Here, according to the present disclosure, it is possible to achieve the advantage that, on the one hand, a more precise measurement is obtained and. for another, the two measurements can be separated. Hereby, preferably, THz transceiver with variable frequencies may be utilised, in particular, fully electronic THz transceivers, with which changes in frequency, e.g. frequency modulations, can be realised technically. Thus, it is also possible to utilise equal first and second THz transceivers, which are subsequently changed in frequency.

According to alternative embodiments, the synchronising means may be designed as
 a) a reference oscillator for direct output of the synchronising signal,
 b) a synchronised trigger, and/or
 c) a network, e.g. bus system, to which the two transceivers are connected.

The determination of the layer thicknesses and/or the material specific properties happens by means of a controller and detector means which receives the measuring signals of the THz transceivers and preferably controls the THz transceivers in order to initiate the steps. The controller and detector means may also be designed separately in the form of a controller means for putting out the control signals and a detector means separate there from.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

The FIGS. 1 through 4 show a THz measuring device 2 in several, in particular, successive measuring steps. The THz measuring device 2 comprises a first THz transceiver 3 and a second THz transceiver 4 between which a measuring space 5 is formed. The two THz transceivers 3, 4 are arranged on a common optical measuring axis B, i.e., their optical measuring axes coincide. Advantageously, the two THz transceivers 3, 4 are equal and/or comprise an equal or similar transceiver chip, i.e., operating at the same frequency.

Advantageously, the THz radiation 8 is put out in parallel, i.e., not focused onto a focal point. The two THz transceivers 3, 4 are arranged at a transceiver distance L thereby determining the width of the measuring space 5.

Further, a synchronising means 6 is provided which synchronises the measurements of the two THz transceivers 3, 4, as described below. The two THz transceivers 3, 4 put out their measuring signals M1, M2 towards a detector means 20, whereby the synchronising means 6 and the detector means 20 may also be integrated.

Figure 1:
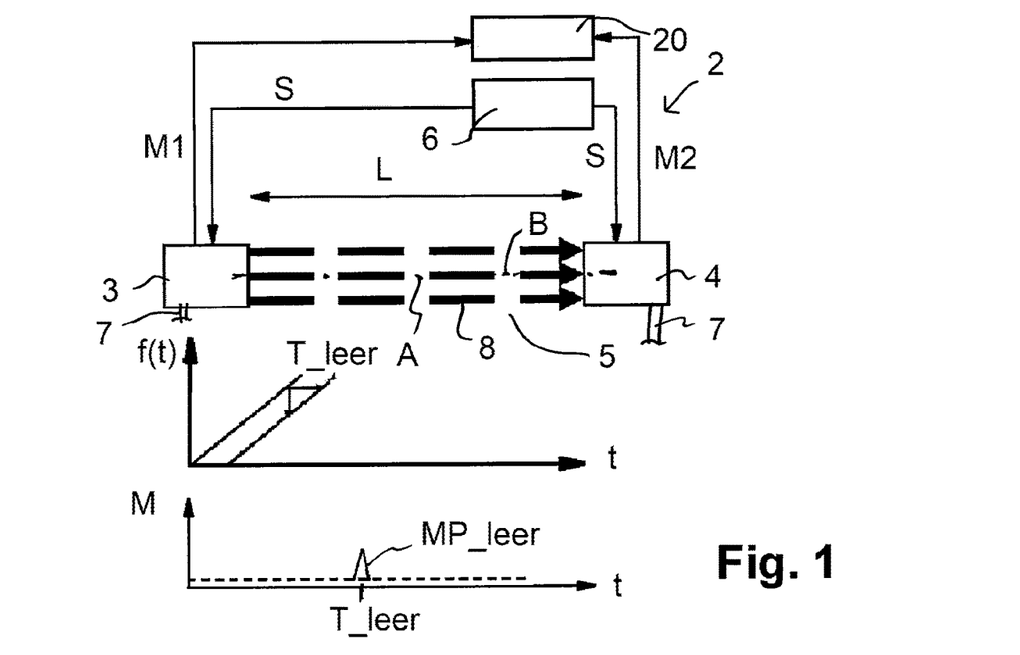
FIG. 1 shows a calibration measurement according to one embodiment of the present disclosure with a frequency-time diagram and a signal-time-of-flight diagram.

FIG. 1 shows a calibrating step for calibrating the THz measuring device 2. To that end, the first THz transceiver 3 THz emits radiation 8 or, respectively, first THz radiation 8 along an optical measuring axis B through the measuring space 5 towards the second THz transceiver 4.

According to the embodiment shown here, the THz radiation 8 is put out as FMCW radiation (frequency modulated continuous wave), i.e., as frequency modulated THz radiation, i.e. where the frequency f or, respectively, core frequency of the THz radiation 8 put out by the first THz transceiver 3 is modulated over time, in particular, as sawtooth wave or ramp course respectively. Thus, in the frequency-time-diagram a frequency shift can be associated with a temporal shift, i.e., temporal delay caused by the time of flight. Instead of measuring by means of such frequency modulation, it is also possible to provide for a direct time of flight measurement; moreover, it is also possible to utilise pulsed radiation allowing, e.g., for a wider bandwidth of the THz radiation 8.

Thus, according to FIG. 1, the THz radiation 8 passes through the transceiver distance L and is detected at the other end of the measuring space 5 at a calibration time of flight T_Leer. Thus, as shown here, in the frequency modulation according to the frequency-time-diagram f(t) the corresponding frequency shift is measured and recalculated as calibration time of flight T_Leer. Thus, according to the lower signal-time-of-flight-diagram of the FIG. 1 the second THz transceiver 4 detects a measuring peak MP_Leer at the time of T_Leer.

The calibration time of flight T_Leer results mathematically from the transceiver distance L and the speed of light (speed of radiation) v_Luft of the THz radiation 8 in air, where such speed of light v_Luft in good approximation can be assumed equal to the speed of light c in a vacuum. Thus, the result is T_Leer=L/(v_Luft)=L/c.

Thus, the measuring space 5 has been calibrated. Next, according to FIG. 2, a transmission measurement of a pipe 12 introduced as measuring object is carried out. Hereby, the THz measuring device 2 is not changed, in particular, the THz transceivers 3, 4 are not readjusted in relation to one another. The pipe 12 is made, in particular, from a material permeable for THz radiation 8, in particular, plastics, but also rubber, paper, ceramic or earthenware. Plastics usually exhibits a refraction index n12 that depends on the exact composition and may lie, e.g., in an area between 1.5 and 2. Hereby, the result is n12=c/v12, where v12=speed of light of the THz radiation in the material of the pipe 12 and n12 as refraction index of the material. Thus, significant signal delays and suitable measuring peaks can be attained. Advantageously, the pipe 12 is transported continuously along an axis of symmetry A extending, in particular, perpendicular to the measuring plane shown. In particular, the axis of symmetry A may intersect orthogonally with the optical measuring axis B.

Figure 2:
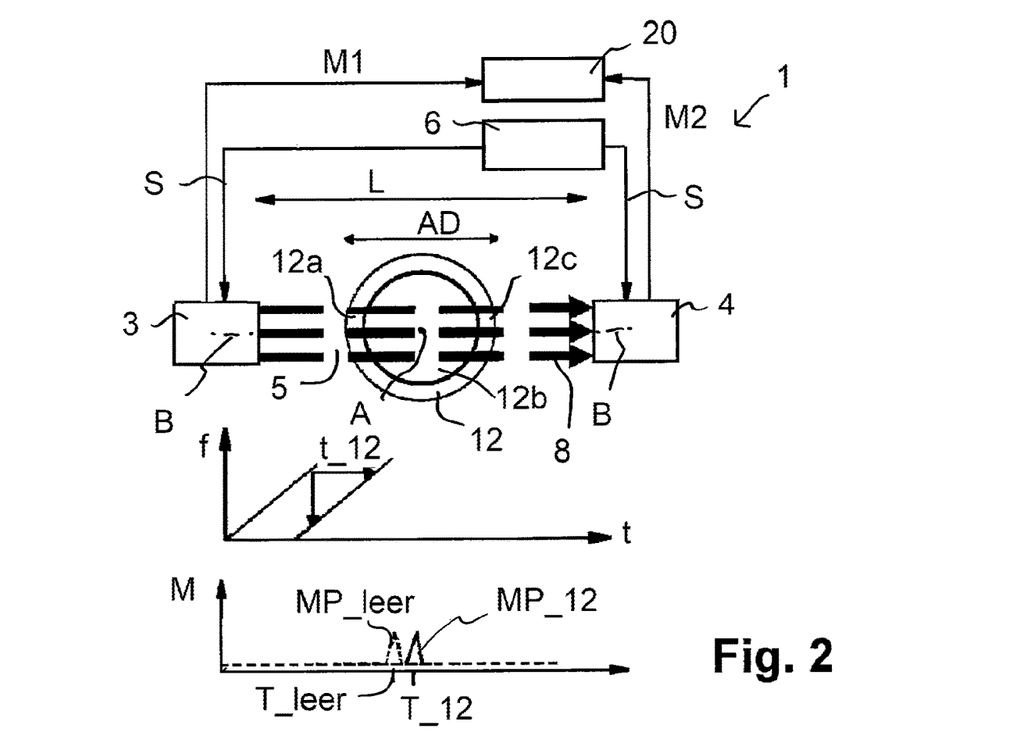
FIG. 2 shows the measuring device during subsequent measuring of the time of flight in transmission through a measuring object, for determining the total time of flight.

Thus, in the measurement of the total time of flight (transmissions time of flight) T_12 with a pipe, as shown in FIG. 2, the first THz transceiver 3 again puts out the THz transmission beam 8 which extends along the optical measuring axis B and first impinges on the front wall area 12a of the pipe 12, passes through this, travels through the interior space 12b of the pipe 12 and later passes through the rear, i.e., second wall area 12c of the pipe 12, to then passing through the measuring space 5 and being detected by the second THz transceiver 4. Thus, the THz transmission beam 8 will be delayed in time first by the front wall area 12a with the first wall thickness WD1 and then by the second wall area WD2.

Thus, according to FIG. 2, middle diagram, in the FMCW-radiation there will be a corresponding frequency shift from which the time of flight T can be determined. Accordingly, the measuring signal or, respectively, the measuring peak MP12 in the total time of flight T_12 is detected and, consequently, is delayed in time by a total delay $\Delta T\_12=T\_12-T\_Leer$.

Thus, the total time of flight T_12 results from the sum of the times of flight through the free areas filled with air, i.e., the interior space 12c and the lateral regions 5_1 and 5-2 of the measuring space 5 to the left and right of the pipe, whereby these times of flight in air may be taken at large as $(L-WD1-WD2)/v\_Luft,$ and the wall times of flight through the wall areas 12a, 12c, whereby these wall times of flight may be taken at large as (WD1+WD2)/v12.

Thus, the total time of flight T_12 will result as $$T\_12 = ((L-WD1-WD2)/v\_Luft) + (WD1+WD2)/v12 = ((L-WD1-WD2)/c) + (WD1+WD2)/(c/n)$$ system of equations GL1

Subsequently, according to FIGS. 3 and 4, the two wall areas 12a and 12c are measured to determine their wall times of flight. These measurements are preferably carried out from both sides so that the first transceiver 3 carries out a single measurement of the wall area 12a which is the front one from its perspective, and, correspondingly, the second THz transceiver 4 carries out a single measurement of the wall area 12c which is the front one from its perspective, i.e., the second wall area 12c.

Figure 3:
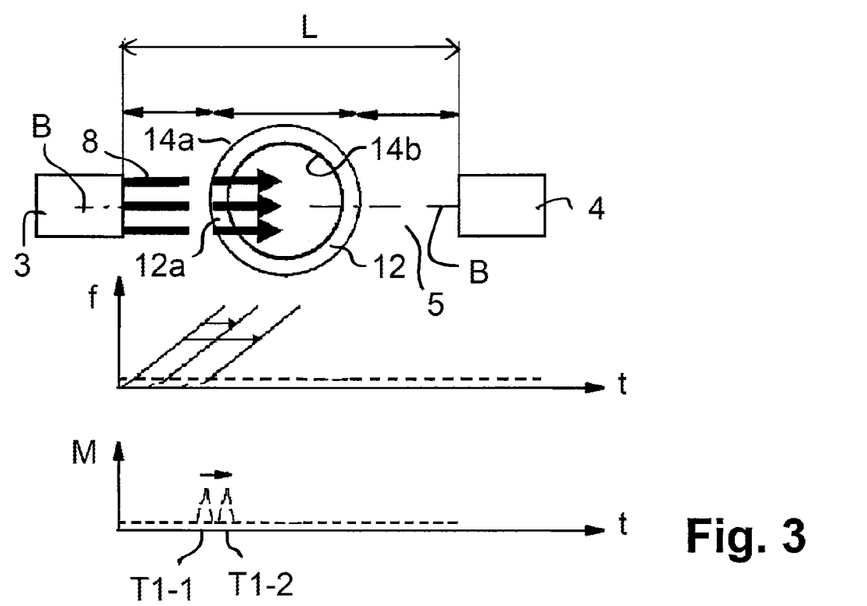
FIG. 3 shows the measuring device from FIG. 1, 2 during measuring of the wall time of flight of a first wall area.

In particular, the measurement according to FIG. 3 can, in principle be combined, e.g., with the measurement of the total time of flight T_12 from FIG. 2 in that in such measurement the first transceiver 3 emits, on the one hand, the THz radiation 8 to be detected by the second THz transceiver 4 according to FIG. 2, and, on the other, as first THz transceiver 3 also measures the reflected radiation. For the sake of clarity, however, the measurements are shown separately in the representations.

Thus, according to FIG. 3, the first THz transceiver 3 emits the THz radiation 8 which is partially reflected each at the interfaces 14a, 14b of the front wall area 12a. Thus, in the case of the front wall area 12a the exterior surface 14a represents the first interface, and the interior surface 14b represents the second interface off which the emitted THz radiation 8 will each be partially reflected. Thus, according to the frequency-time-diagram and the signal-time-of-flight-diagram of FIG. 3, what is measured is:

An exterior reflection peak MP3-1 at a first reflection time T1_1 from the transceiver 3 to the exterior surface 14a of the first wall area 12a and back, an interior reflection peak MP3-2 at a second reflection time T1_2 from the transceiver 3 to the interior surface 14b of the first wall area 12a and back, and, by subtraction these measuring values, i.e., reflection times, with subsequent division by the factor 2, a first wall time of flight T_WD1. The determining difference of the measuring values first represents the double value of a single time of flight wall time of flight T_WD1 so that the (single) wall time of flight can be determined by cancelling by the factor 2.

Thus, what results for the first wall thickness WD1 and the first wall time of flight T_WD1 through the first wall thickness WD1 is the following system of equations:

$$WD1 = c/(2n)*(T1\_2-T1\_1) = c/(2n)T\_WD1 \text{ system of equations GL2}$$

Figure 4:
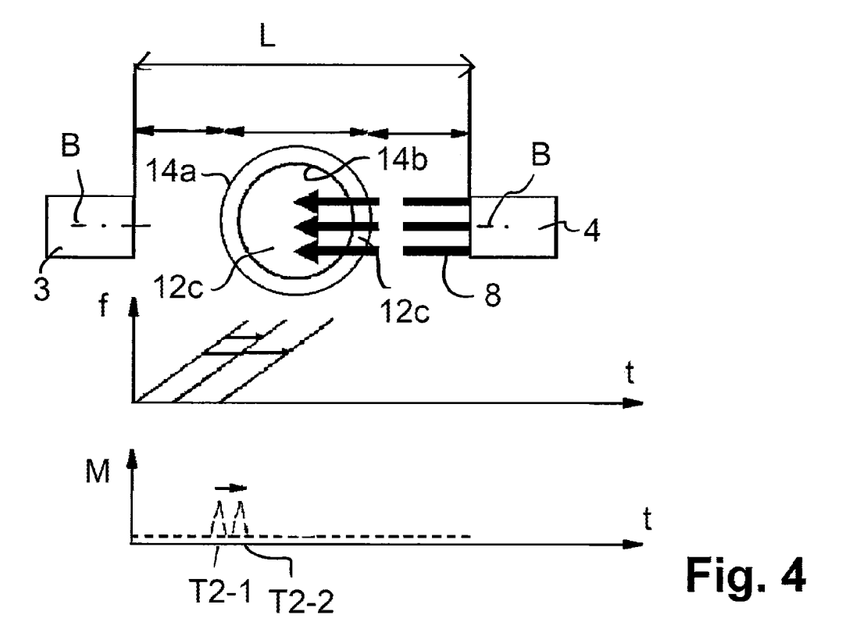
FIG. 4 shows the measuring device from FIGS. 1 through 3 during measuring of the wall time of flight of a second wall area.

According to FIG. 4, the corresponding measuring of the second wall area 12c, i.e. in the Figures of the right wall area of the pipe 12, is carried out by the second THz transceiver 4.

Thus, accordingly, the second wall thickness WD2 and the second (single) wall time of flight T_WD2 through the second wall thickness WD2 results as:

$$WD2 = c/(2n)*(T2\_2-T2\_1) = c/(2n)T\_WD2 \text{ system of equations GL3}$$

Thus, the measurements of the wall times of flight according to FIGS. 3 and 4 correspond to one another or, respectively, are symmetric, even if the distance of the exterior surface 14a from the transceivers 3, 4 may be different; in such a subtraction this will have no effect.

The calibration measurement or, respectively, empty measurement shown in FIG. 1 may, in particular, be carried out from both sides, i.e., both from the first transceiver 3 through the empty measuring space towards the second transceiver 4, and vice versa, accordingly, from the second transceiver 4 through the measuring space 5 along the common optical measuring axis B towards the first transceiver 3, e.g., with subsequent averaging, and/or for correcting or, respectively, compensating the differences of the empty measurements from the two sides so as to determine technical differences of the transceivers 1 and 2 by means of which, in particular, a correction or, respectively, compensation of the second wall time of flight measurement shown in FIG. 4 may be carried out.

In the calibration measurement of FIG. 1 and the measurement of the total time of flight of FIG. 2 the two THz transceivers 3, 4 are synchronised by the synchronising means 6 using the synchronising signals S; in den individual measurements of FIGS. 3 and 4 this is not required because, here, the THz transceivers 3, 4 each act as transceivers, i.e., transmitter and receiver means, thereby directly determining the wall times of flight.

Thus, it is possible to derive from the measurements according to FIGS. 1 through 4, one the one hand, the total time of flight and, on the other also wall times of flight of the two wall areas 12a, 12b so that a system of equations can be carried out for determining the three unknown quantities, i.e., the first wall thickness WD1, the second wall thickness WD2, and also the refraction index n12 (or, respectively, the speed of light v12 in the material of the pipe 12), based upon the following system of equations GL4:

$$T\_12 = ((L - WD1 - WD2)/v\_Luft) + (WD1 + WD2)/v12$$
$$= ((L - WD1 - WD2)/c) + (WD1 + WD2)/(c/n)$$
$$= ((L - (WD1 + WD2))/c) + (WD1 + WD2)/(c/n)$$
$$\Rightarrow n = (T\_12 * c - L + (WD1 + WD2))/(WD1 + WD2)$$
$$\Rightarrow WD1 = c/2n * (T\_WD1)$$
$$\Rightarrow WD2 = c/2n * (T\_WD2)$$
$$T\_Leer = (L/V\_Luft) = L/c$$
$$L = T\_Leer * c$$

system of equations GL4

Hereby, the known quantities are

T_12=measuring value from measurement with pipe 12
T_Leer=measuring value from empty measurement
L=distance of the transceivers
C=speed of light
Hereby, the unknown quantities are
WD1+WD2=wall thickness 1+wall thickness 2=y
n=refraction index of the pipe 12

Thus, it is possible to derive from the measurements according to FIGS. 1 through 4, one the one hand, the total time of flight and, on the other also wall times of flight of the two wall areas 12a, 12b so that a system of equations can be carried out for determining the three unknown quantities, i.e., the first wall thickness WD1, the second wall thickness WD2, and also the refraction index n12 (or, respectively, the speed of light v12 in the material of the pipe 12), based upon the following system of equations GL4:

Thus, GL4 may be utilised in the method according to the present disclosure and the measuring device according to the present disclosure.

The calibration measurement of FIG. 1 cam be carried out in advance before the pipe 12 is transported. Thereafter, the pipe 12 may be continuously transported along the axis of symmetry A and measured by the two transceivers 3, 4 according to FIGS. 2, 3 and 4. Hereby, as explained above, e.g., measurements from FIGS. 2 and 3 may be combined. Upon completion of the measurement of the pipe 12 an empty measurement according to FIG. 1 may be carried out again so as to check for deviations compared to the first empty measurement.

Figure 5:
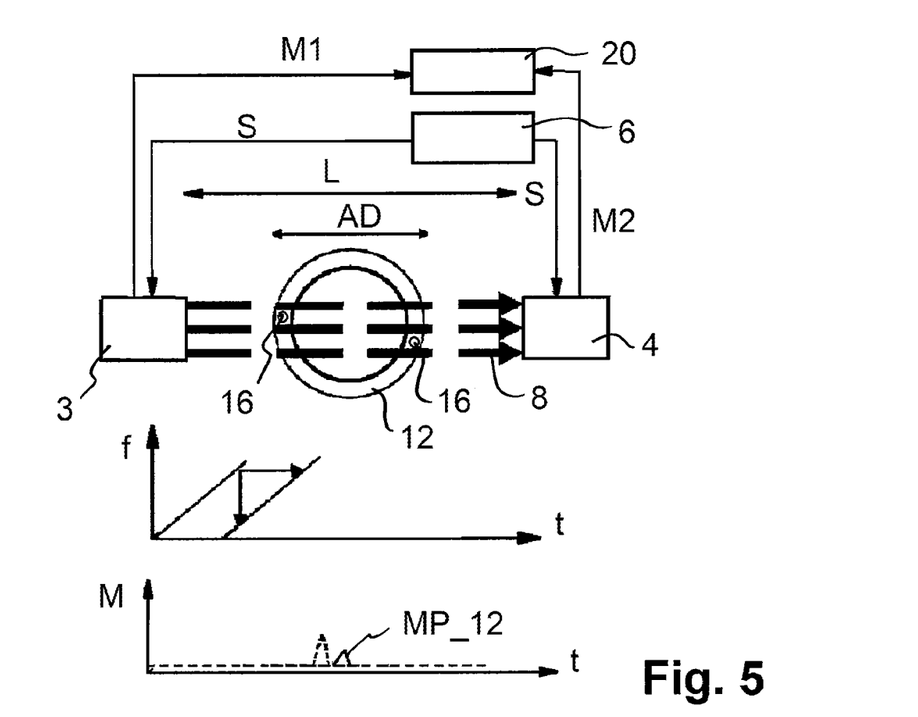
FIG. 5 shows a measurement with faults in the measuring object.
Figure 6:
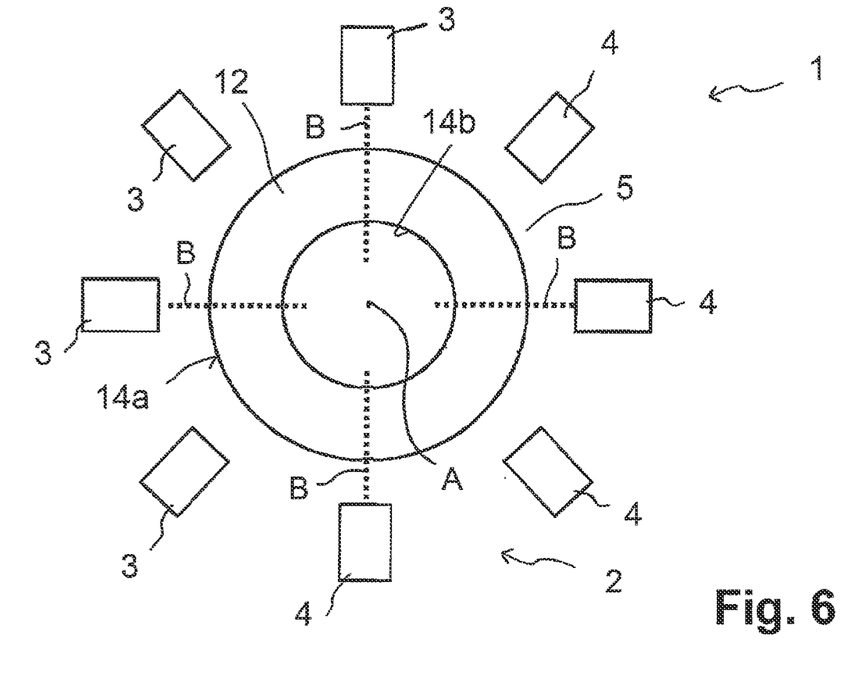
FIG. 6 shows a measuring device of an embodiment including a plurality of transceiver pairs.

FIG. 5 shows the measuring of a pipe 12 with faults 16 in or on the pipe 12. The faults 16 may be e.g. shrink holes, i.e. air inclusions, in the wall areas WD1, WD2, but also foreign objects. Moreover, irregularities or structures respectively, e.g. by burnup of material, may occur at the exterior surface 14a or interior surface 14b.

According to the signal-time-of-flight-diagram of FIG. 5, there will be—compared to the measurement of the total time of flight according to FIG. 2—in particular, a change of the measuring signal or the measuring peaks MP_12 respectively, in particular, in the level of intensity and/or shape. Thus, a qualitative or a quantitative evaluation of the measuring signal MP_12 may be utilised to detect faults 16. In detecting such faults 16 it is possible to subsequently carry out, e.g., a detailed determination by adjusting the THz transceivers 3, 4 to the appropriate spots or, respectively around such spots.

The measuring device 2 may be designed static or non-static. In case of a static arrangement, advantageously, according to FIG. 7, a plurality of transceiver pairs 3, 4 are arranged opposite one another around the measuring space 5. The individual pairs of transceivers 3, 4 may even emit different types of THz radiation, e.g., of different polarisation.

In case of a non-static arrangement, one or more pairs of von THz transceivers 3, 4 may revolve around the measuring space 5, i.e., rotate; further, one or more pairs of von THz transceivers 3, 4 may reverse, i.e., pivot back and forth about the axis of symmetry A.

Advantageously, the THz transceivers 3, 4 or, respectively, also the plurality of pairs of transceivers are arrange on a common frame 7, so as to attain a fixed mechanical coupling.

Figure 7:
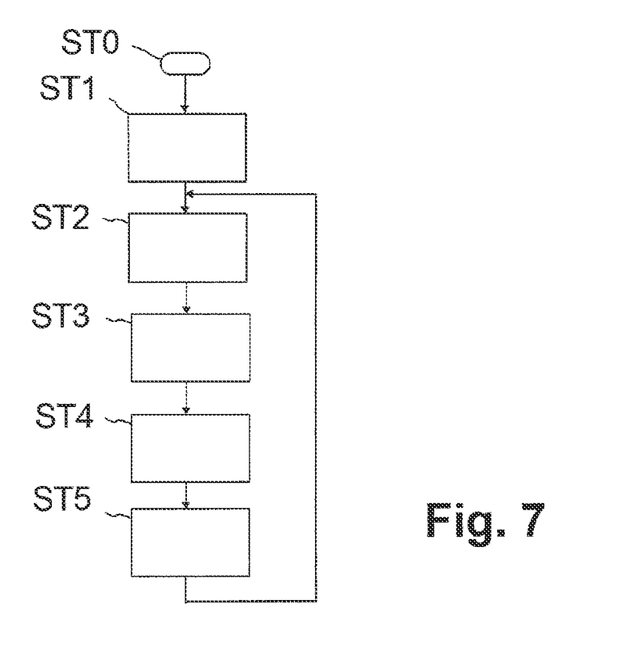
FIG. 7 shows a flow chart of a method according to the present disclosure.

FIG. 7 shows a flow chart of the method according to the embodiment described.

Following the start in step ST0 of providing the measuring arrangement 1, subsequently, the calibration measurement shown in FIG. 1, i.e., empty measurement in transmission, is carried out according to step ST1, and the empty time of flight T_Leer is determined. As described above, the empty measurement or, respectively, the calibration measurement in transmission may also be carried out from both sides so that each transceiver 3, 4 both emits and receives the THz radiation 8, e.g., to carry out an averaging; moreover, by virtue of such a comparison it may be possible to even correct the synchronising means 6.

Thereafter, in step ST2, the measurement of the total time of flight T_12 out with the pipe 12 is carried out, as shown in FIG. 2. According to step ST3, the measurement of the first wall time of flight T_WD1 is carried out, and, in step ST4, the measurement of the second wall time of flight T_WD2. Thus, in the subsequent step of determination ST5, according to the system of equations described above, the values WD1, WD2 and n12 are continuously determined from the measurements. Further, the so determined values may also be continuously checked and compared to each other.

Thus, according to FIG. 7, the process can be reset to a state prior to step ST2, i.e., carried continuously.

Hereby, as described above, the measurements according to FIGS. 2 through 4 may be combined. Further, the sequence of the measuring steps ST2, ST3, ST4 may be varied.

THz (Terahertz) measurements are used, inter alia, for continuous measuring of transported measuring objects. Thus, strings, e.g., pipes, profiles or cables made from a material like plastics or rubber after production can be measured continuously for their geometric formation and possible faults. Thus, the THz radiation can be reflected at boundary surfaces and subsequently detected. When the speed of light of the THz radiation in the material is understood, it is possible to subsequently determine layer thicknesses and/or diameters from measured time of flight differences of the detected THz radiation. Sometime, however, the precise speed of light in the material is unknown, in particular, with a material of unknown temperature and in the case of material mixes.

Initially, one may carry out a calibration measurement of the empty measuring space without the measuring object in that a THz transceiver sends THz radiation through the measuring space to a reference mirror, and the radiation reflected by the reference mirror back to the THz transceiver is subsequently detected. Thus, a measuring signal will be obtained having a total reflection peak. Thereafter an object measurement will be carried out by the same THz transceiver with an inserted pipe. Hereby, the same THz transceiver again sends the THz radiation through the two wall areas of the pipe towards the reference mirror, which sends the radiation back through the measuring object to the THz transceiver. Thereafter, layer thicknesses and material properties can be determined from these measurements.

However, with such measurements certain difficulties will appear, in particular, in the case of faults in the material and stronger absorption by the material. Also, the exact alignment of the components is complex.

A comparative THz measuring device for measuring at least one layer thickness of a test object conveyed along a conveying direction, comprising a main THz sensor for emitting a main THz beam along a first optical axis in a detection plane perpendicular to the conveying direction and for receiving THz radiation reflected along the first optical axis, as well as including at least one additional THz sensor for emitting an additional THz beam along a second optical axis, extending outside the detection plane and/or at an angle to the detection plane, for detecting the additional THz beam reflected back along the second optical axis. In a signal amplitude of the additional THz sensor additional reflection peaks may be determined which are caused by faults in the test object.

A comparative method for controlling a production system for planar or strand-shaped bodies, in which the body is conveyed in a conveying direction through a measurement region and irradiated with measurement radiation in the gigahertz or terahertz frequency range, the measurement radiation at least partially penetrating the body, and measurement radiation reflected from the body is detected and the refractive index of the body and/or the absorption of the measurement radiation by the body is determined using the detected measurement radiation, wherein at least one production parameter of the production system is controlled on the basis of the refractive index determination and/or the absorption determination. Thus, here too, a measurement of layer thicknesses is carried out by detection of the radiation reflected at interfaces.

The present disclosure is based, at least in part, on the object of creating a THz measuring device and a THz measuring method for measuring measuring objects allowing for a precise measuring of measuring objects at little cost.

This task is solved by a THz measuring device and a THz measuring method according to the independent claims. Furthermore, an arrangement from the THz measuring device and an included measuring object is provided. The sub-claims describe preferred further developments.

DESCRIPTION OF SYMBOLS 1 measuring arrangement
2 THz measuring device
3 first THz transceiver
4 second THz transceiver
5 measuring space
6 synchronising means
8 THz radiation
10 reference oscillator
12 measuring object, in particular strand, e.g. pipe
12a first wall area
12b interior space of the measuring object 12
12c second wall area
16 fault
17 frame of the THz measuring device 2
20 detector means
A axis of symmetry, in particular central axis, of the measuring object
B measuring axis
L transceiver distance
M1 first measuring signal of the first THz transceiver 3
M2 second measuring signal M2 of the second THz transceiver
MP measuring peaks
MP-Leer measuring peak of the calibration measurement
n12 refraction index of the material of the measuring object
S synchronising signal
T_Leer calibration time of flight, empty time of flight according to FIG. 1
T_12 total time of flight with measuring object according to FIG. 2
ΔT_12 total delay as T-12–T_Leer
v_Luft speed of light (beam speed) in air (approximately c)
v12 speed of light (beam speed) in the material of the measuring object 12
WD1 first wall thickness, wall thickness left side
WD2 second wall thickness, wall thickness right side
AD exterior diameter of the measuring object 12
ID interior diameter of the measuring object 12
T1_1 first reflection time from the transceiver 3 to the exterior surface 14a of the first wall area 12a and back
MP1_1 exterior reflection peak to the first reflection time T1_1 from the transceiver 3 to the exterior surface 14a of the first wall area 12a and back,
T1_2 second reflection time from the transceiver 3 to the interior surface 14b of the first wall area 12a and back,
MP1-2 interior reflection peak to the second reflection time T1_2 from the transceiver 3 to the interior surface 14b of the first wall area 12a and back,
T2_1 first reflection time from the transceiver 4 to the exterior surface 14a of the second wall area 12c and back
MP2_1 exterior reflection peak to the first reflection time T2_1 from the transceiver 4 to the exterior surface 14a of the second wall area 12c and back,
T2_2 second reflection time from the transceiver 3 to the interior surface 14b of the second wall area 12c and back,
MP2-2 internal reflection peak to the second reflection time T2_2 from the transceiver 4 to the interior surface 14b of the second wall area 12c and back
T_WD1 first wall time of flight
T_WD2 second wall time of flight
ST1 step of empty measuring, calibration measurement
ST2 step of measuring the total time of flight
ST3 step of measuring the first wall time of flight
ST4 step of measuring the second wall time of flight
ST5 step of determining and/or calculating

The invention claimed is:

1. A THz measuring device for measuring a measuring object, the THz measuring device comprising:
a measuring space for receiving a measuring object,
a first THz transceiver designed to emit THz radiation through the measuring space and to receive THz radiation,
a second THz transceiver designed to emit THz radiation through the measuring space and to receive THz radiation emitted by the first THz transceiver,
a synchronising means designed to synchronise emission times and/or measuring times of the two transceivers,
a detector means designed to receive a first measuring signal of the first THz transceiver and a second measuring signal of the second THz transceiver and to determine at least one layer thickness and/or at least one layer property,
wherein the two THz transceivers lie opposite one another and the measuring space is formed between them,
the detector means being designed to determine the layer thickness and/or the at least one layer property from one or more of the following measurements:
an empty measurement, wherein the first THz transceiver puts out the THz radiation through the empty measuring space towards the second THz transceiver and the second THz transceiver measures an empty time of flight,
a measurement of the total time of flight, wherein the first THz transceiver puts out the THz radiation through the measuring space and through the measuring object towards the second THz transceiver and the second THz transceiver measures a time of flight with a measuring object, and
at least one wall area measurement, wherein the first and/or second transceiver THz puts out radiation and detects the THz radiation reflected at interfaces of at least one wall area.

2. The THz measuring device of claim 1, wherein the synchronising means is designed as one of the following means:
a) a reference oscillator for putting out a reference signal,
b) a synchronised trigger for putting out a synchronising signal, and/or
c) a network to which the two transceivers are connected.

3. The THz measuring device of claim 1, wherein the two transceivers are arranged opposite on a common optical measuring axis extending through the measuring space and, further, are arranged and designed to emit the THz radiation along the common optical measuring axis into or through measuring space.

4. The THz measuring device of claim 1, wherein the detector means is designed to control
   a first wall area measurement through the first transceiver for measuring a first wall time of flight and
   a second wall area measurement through the second transceiver for measuring a second wall time of flight, in particular, successively by the two transceivers, and the detector means is designed to determine the first wall thickness of the first wall area and the second wall thickness of the second wall area.

5. The THz measuring device of claim 4, wherein each of the two transceivers each carries out the wall area measurement of the wall area facing it and lying in front of it, in particular, in a measuring step together with the measurement of the total time of flight.

6. The THz measuring device of claim 1, wherein the detector means is designed to determine both at least one layer thickness, in particular, two wall thicknesses of the measuring object, and the at least one material property, in particular, a refraction index and/or a speed of light of the THz radiation in the material of the measuring object.

7. The THz measuring device of claim 1, wherein the two transceivers put out THz radiation at a frequency in a range of between 10 GHz and 50 THz, e.g. 20 GHz and 4 THz, e.g. 50 GHz and 1 THz, in particular, using frequency modulation or direct time-of-flight measurement or pulsed radiation.

8. The THz measuring device of claim 1, wherein the THz measuring device is designed to continuously carry out the measurement of the total time of flight and the measurements of the first and second wall times of flight, and the detector means is designed to continuously determine, from continuous measuring values of the total time of flight and the wall times of flight, the at least one layer thickness and/or the at least one material property, in particular, with a measuring object passing continuously through the measuring space.

9. The THz measuring device of claim 1, wherein the THz transceivers are arranged statically around the common measuring space, in particular, as a plurality of pairs each consisting of a first THz transceiver and a second THz transceiver.

10. The THz measuring device of claim 1, wherein at least one pair of THz transceivers is provided on a frame adjustably, in particular, reversing around the measuring space or revolving around the measuring space or rotating, for measuring the entire circumference of the measuring object in the measuring space.

11. The THz measuring device of claim 1, wherein the first and/or second THz transceiver is designed to emit and/or receive the THz radiation parallel along the optical measuring axis, in particular, in a two-dimensional parallel manner.

12. The THz measuring device of claim 1, wherein the detector means is designed to determine an exterior diameter and/or interior diameter of the measuring object.

13. The THz measuring device of claim 1, wherein the detector means is designed to determine a first wall thickness, a second wall thickness, and a refraction index n of the measuring object in accordance with:

$$n=(T\_12*c-L+(WD1+WD2))/(WD1+WD2)$$

$$WD1=c/2n*(T\_WD1)$$

$$WD2=c/2n*(T\_WD2)$$

with $L=T\_Leer*c$ wherein
WD1=wall thickness 1
WD2=wall thickness 2
n=refraction index of the pipe 12
T_12=measuring value from the measurement with pipe 12
T_Leer=measuring value from empty measurement
L=distances of the transceivers
C=speed of light
(system of equations GL4).

14. A Measuring arrangement, comprising:
   a THz measuring device according to claim 1, and
   a measuring object guided through the measuring space of the THz measuring device, in particular, a profile, e.g. pipe and/or rectangular profile and/or semi-open profile, e.g. curved trough.

15. A THz measuring method for measuring a measuring object, including at least the following steps:
   providing a THz measuring device including at least one first THz transceiver, a second THz transceiver arranged opposite of the first THz transceiver, whereby a measuring space is formed between the two THz transceivers,
   empty measurement, emitting THz radiation from one of the two THz transceivers through the empty measuring space towards the other THz transceiver, detecting the THz radiation by the other THz transceiver and determining an empty time of flight,
   introducing a measuring object into the measuring space,
   measuring a total time of flight by emitting THz radiation from one of the THz transceivers through the measuring space and the measuring object towards the other THz transceiver and detecting the THz radiation by the other THz transceiver and
   determining a time of flight with a measuring object,
   emitting THz radiation by the first THz transceiver through the measuring space towards a first wall area of the measuring object and detecting the THz radiation reflected off interfaces of the first wall area by the first THz transceiver and determining a first wall time of flight,
   emitting THz radiation by the second THz transceiver through the measuring space towards a second wall area of the measuring object and detecting the THz radiation reflected off interfaces of the second wall area by the second THz transceiver and determining a second wall time of flight,
   determining at least one layer thickness and/or the at least one material property from the empty measurement, the measurement of the total time of flight, and the two measurements of the first and second wall times of flight.

16. The Method of claim 15, wherein the measurements of the two THz transceivers are carried out on a common optical measuring axis which extends through the measuring space between the two THz transceivers.

17. The Method of claim 15, wherein the measurement of the first wall time of flight by the first THz transceiver and the measurement of the second wall time of flight by the second THz transceiver are each carried out by measuring the front wall area lying in front of the THz transceiver.

18. The Method of claim 15, wherein the measurement of the total time of flight and the measurement of the first or the second wall time of flight are carried out jointly.

19. The Method of claim 15, wherein as measuring object a strand is guided continuously through the measuring space, in particular, a single layer pipe or rectangular profile, and the wall thicknesses and/or the at least one material property are determined continuously, using the at least one common empty measurement.

20. The Method of claim 15, wherein the empty measurements are carried out repeatedly anew, for correcting or for determining changes of the transceiver distance.

21. The Method of claim 15, wherein the empty measurement is carried out by both THz transceivers and subsequently a comparison and/or averaging is carried out.

22. The Method of claim 15, wherein a fault in the measuring object is determined as an attenuation of the intensity of the signal amplitude and/or the signal shape of a measuring signal in the measurement of the total time of flight and/or in measurement of the first wall area and/or in the measurement of the second wall area.

23. The Method of claim 15, wherein the measuring object is measured in the measuring space over its entire circumference by:

at least one pair of THz transceivers which reverse around the measuring space or rotate around the measuring space, or a static arrangement of a plurality of pairs of first and second THz transceivers which are provided around the measuring space.

24. The Method of claim 15, wherein what is utilised by the first THz transceiver and the second THz transceiver one of the group consisting of equal frequencies, different frequencies or frequency bands representing different partial regions of a band width, overlapping frequencies or frequency bands representing different partial regions of a band width where, subsequently the measuring signals of the first THz transceiver and the second THz transceiver are combined to an evaluation signal, a fundamental frequency of the evaluation signal is determined, so as to subsequently carry out a calculation of one or more layer thicknesses.

* * * * *